US010069560B2

(12) United States Patent
Ha et al.

(10) Patent No.: US 10,069,560 B2
(45) Date of Patent: *Sep. 4, 2018

(54) INTEGRATED RESOURCE PLANNING FOR SATELLITE SYSTEMS

(71) Applicant: THE BOEING COMPANY, Chicago, IL (US)

(72) Inventors: Tuan Ha, Irvine, CA (US); Litho Kwong, Los Angeles, CA (US); Anchung Chang, San Gabriel, CA (US); Becky X. Li, Rowland Heights, CA (US); James Perez, Lomita, CA (US); June Bishton, Placentia, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,400

(22) Filed: Jul. 21, 2016

(65) Prior Publication Data

US 2016/0329956 A1    Nov. 10, 2016

Related U.S. Application Data

(63) Continuation of application No. 14/091,227, filed on Nov. 26, 2013, now Pat. No. 9,426,666.

(51) Int. Cl.
*H04B 7/185* (2006.01)
*H04B 7/204* (2006.01)
(Continued)

(52) U.S. Cl.
CPC ........... *H04B 7/2041* (2013.01); *H04B 7/185* (2013.01); *H04B 7/18513* (2013.01);
(Continued)

(58) Field of Classification Search
CPC ... H04W 16/18; H04W 52/243; H04W 24/02; H04B 7/185
(Continued)

(56) References Cited

U.S. PATENT DOCUMENTS 6,463,279 B1 * 10/2002 Sherman ............ H04B 7/18539
455/12.1
2004/0072539 A1 * 4/2004 Monte ................ H04B 7/18563
455/13.4
(Continued)

FOREIGN PATENT DOCUMENTS

WO         01/41548 A2    6/2001
WO    WO 0141548 A2 *    6/2001    ......... H04B 7/18543

OTHER PUBLICATIONS

Extended European Search Report, Application No. 14193104.8-1855, dated Apr. 29, 2015.

*Primary Examiner* — Md Talukder
(74) *Attorney, Agent, or Firm* — Haynes and Boone, LLP

(57) ABSTRACT

A system, method, and apparatus for integrated resource planning for satellite systems are disclosed. The method involves obtaining user communication demand for at least one region. The method further involves generating a beam map comprising at least one beam for each of the regions according to the user communication demand. Also, the method involves generating at least one configuration profile for the satellite system by using the beam map. Additionally, the method involves performing a performance analysis by comparing: the user communication demand versus one of the configuration profiles, the user communication demand versus actual communication demand, one of the configuration profiles versus the actual communication demand, and/or one of the configuration profiles versus another one of the configuration profiles. Further, the method optionally involves determining power flux spectral density (PFSD) for
(Continued)

the beam frequency spectrum for each of the beams by using at least one of the configuration profiles.

20 Claims, 17 Drawing Sheets

(51) Int. Cl.
    *H04W 16/18*     (2009.01)
    *H04W 24/02*     (2009.01)
    *H04W 52/24*     (2009.01)
    *H04W 16/02*     (2009.01)

(52) U.S. Cl.
    CPC ..... *H04B 7/18515* (2013.01); *H04B 7/18519* (2013.01); *H04B 7/18539* (2013.01); *H04W 16/02* (2013.01); *H04W 16/18* (2013.01); *H04W 24/02* (2013.01); *H04W 52/243* (2013.01)

(58) Field of Classification Search
    USPC .................. 455/13.1, 450, 464, 509, 62, 71
    See application file for complete search history.

(56) References Cited

U.S. PATENT DOCUMENTS

| | | | |
|---|---|---|---|
| 2009/0023384 A1* | 1/2009 | Miller | H04B 7/18513 455/12.1 |
| 2013/0009809 A1* | 1/2013 | Bert | H04B 7/2041 342/354 |
| 2013/0242857 A1* | 9/2013 | Tani | H04B 7/185 370/316 |
| 2015/0147959 A1* | 5/2015 | Ha | H04B 7/185 455/13.1 |
| 2016/0329956 A1* | 11/2016 | Ha | H04B 7/185 |

\* cited by examiner

INTEGRATED RESOURCE PLANNING FOR SATELLITE SYSTEMS

CROSS-REFERENCE TO RELATED APPLICATION

This application is a Continuation application of, and claims the benefit of, U.S. patent application Ser. No. 14/091,227, filed on Nov. 26, 2013, titled "Integrated Resource Planning for Satellite Systems", which is hereby incorporated by reference in its entirety.

FIELD

The present disclosure relates to resource planning. In particular, it relates to integrated resource planning for satellite systems.

BACKGROUND

Currently, resources in a satellite system are allocated in a disjointed effort, which does not ensure that all of the system constraints are not violated. As such, there is a need for an integrated solution that performs resource allocation for a satellite system, while ensuring that all system constraints are not violated.

SUMMARY

The present disclosure relates to a method, system, and apparatus for integrated resource planning for satellite systems. In one or more embodiments, a method for integrated resource planning for a satellite system involves obtaining, by at least one computer, user communication demand for at least one region. The method further involves generating, by at least one computer, a beam map comprising at least one beam for each of the regions according to the user communication demand. In addition, the method involves generating, by at least one computer, at least one configuration profile for the satellite system by using the beam map. Further, the method involves performing, by at least one computer, performance analysis by comparing the user communication demand versus one of the configuration profiles, the user communication demand versus actual communication demand, one of the configuration profiles versus the actual communication demand, and one of the configuration profiles versus another one of the configuration profiles.

In one or more embodiments, at least one of the regions is defined by a polygon. In some embodiments, the polygon is defined by at least three points, where each point comprises a latitude and a longitude. In one or more embodiments, at least one of the beams is a cell.

In at least one embodiment, the generating, by at least one computer, at least one configuration profile involves: assigning a gateway frequency spectrum for each gateway of the satellite system; assigning an allocation group frequency spectrum for each allocation group; assigning a beam frequency spectrum for each beam in the beam map; assigning a service band frequency spectrum for each gateway; assigning power for a carrier of the beam frequency spectrum for each beam to achieve a desired data rate and/or link margin for each beam; verifying that the assigned power will not overdrive any components on the satellite; verifying that the assigned power will not overdrive any components on each gateway; estimating an amount of interference the allocation group frequency spectrums are causing to the service band frequency spectrum; and/or using at least one of the assigned gateway frequency spectrums, the allocation group frequency spectrums, the beam frequency spectrums, the service band frequency spectrum, and the powers for the carriers to generate at least one configuration profile. In at least one embodiment, the components on the satellite verified not to be overdriven comprise a solid state power amplifier (SSPA), a traveling wave tube amplifier (TWTA), and/or a diplexer. The tool also ensures that the Ground Satellite Base Station Subsystem (SBSS) dynamic power range is not exceeded.

In one or more embodiments, each of the allocation groups comprises at least one terminal type. In some embodiments, at least one terminal type is a handheld-inconspicuous device, a handheld-smartphone device, a handheld-ruggedized device, an asset tracking device, a portable device, a semi-fixed device, a vehicular device, a maritime-small device, a maritime-large device, and/or an aeronautical device.

In at least one embodiment, the service band frequency spectrum is a return calibration (RCAL) frequency spectrum, a forward calibration (FCAL) frequency spectrum, an absolute calibration (ACAL) frequency spectrum, and/or a pointing reference beacon (PRB) frequency spectrum. In some embodiments, the method further involves determining, by at least one computer, the power flux spectral density (PFSD) for each beam frequency spectrum by using at least one configuration profile.

In one or more embodiments, a system for integrated resource planning for a satellite system involves at least one computer to obtain user communication demand for at least one region; to generate a beam map comprising at least one beam for each of the regions according to the user communication demand; to generate at least one configuration profile for the satellite system by using the beam map; and/or to perform performance analysis by comparing the user communication demand versus one of the configuration profiles, the user communication demand versus actual communication demand, one of the configuration profiles versus the actual communication demand, and/or one of the configuration profiles versus another one of the configuration profiles.

In one or more embodiments, to generate, by at least one computer, at least one configuration profile comprises to assign a gateway frequency spectrum for each gateway of the satellite system; to assign an allocation group frequency spectrum for each allocation group; to assign a beam frequency spectrum for each beam in the beam map; to assign a service band frequency spectrum for each gateway; to assign power for a carrier of the beam frequency spectrum for each beam to achieve a desired data rate and/or link margin for each beam; to verify that the assigned power will not overdrive any components on the satellite and on each gateway; to estimate an amount of interference the allocation group frequency spectrums are causing to the service band frequency spectrum; and to use the assigned gateway frequency spectrums, the allocation group frequency spectrums, the beam frequency spectrums, the service band frequency spectrum, and/or the powers for the carriers to generate at least one configuration profile.

In at least one embodiment, at least one computer is further configured to determine the power flux spectral density (PFSD) for each beam frequency spectrum by using at least one configuration profile.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for integrated resource planning for satellite systems. In particular, the disclosed system comprises resource allocation (RA) tools that provide for an integrated solution for allocation resources (e.g., frequency spectrum and power) for a satellite system, while ensuring that system constraints are not violated.

In at least one embodiment, the present disclosure teaches RA tools that provide guidance to a user for allocating resources in, for example, a mobile satellite system (MSS), and for generating the necessary system configuration data (e.g., in the form of a configuration profile) for the MSS. The RA tools manage system resources and constraints that are introduced by integrating multiple technologies ranging from production terminals (e.g., smartphones), satellite frequency spectrum and power resources, ground based beam former (GBBF) resources, satellite based station subsystem (SBSS) resources, and the GEO (geostationary earth orbit) mobile radio (GMR)-1 third generation (3G) common air interface.

In addition, in at least one embodiment, the disclosed system ensures that the terminal (e.g., a Smartphone) transmit and receive power are within the terminal's dynamic range, ensures that the satellite frequency spectrum and power usage do not exceed their limits, configures the support system (e.g., system calibration) to ensure proper operation of the system, ensures that the GBBF beamport usage is not exceeded, and/or ensures proper configuration of the SBSS resources to be compliant to the GMR-1 3G standard.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
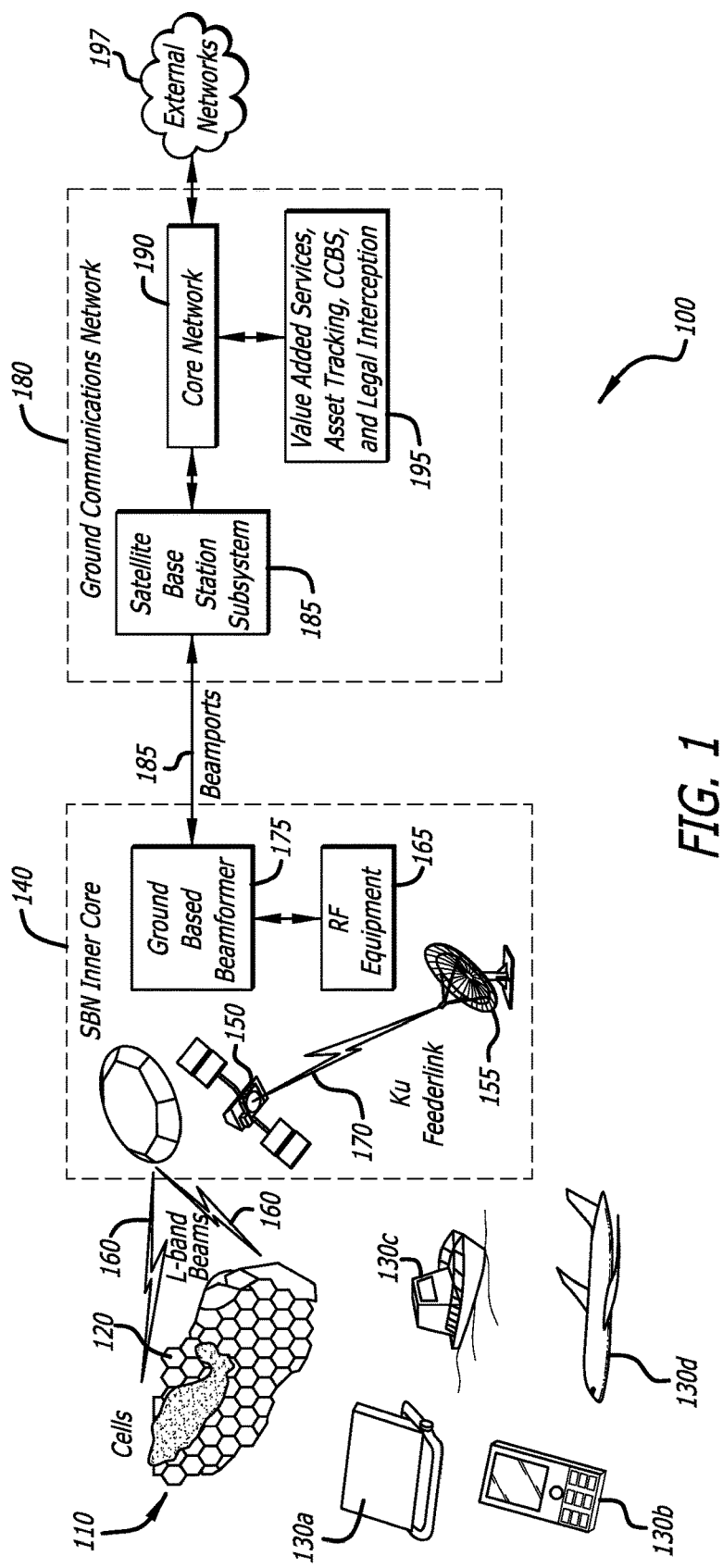
FIG. 1 is a schematic diagram of an exemplary satellite system that may employ the disclosed method for integrated resource planning for satellite systems of FIG. 4, in accordance with at least one embodiment of the present disclosure.
Figure 4:
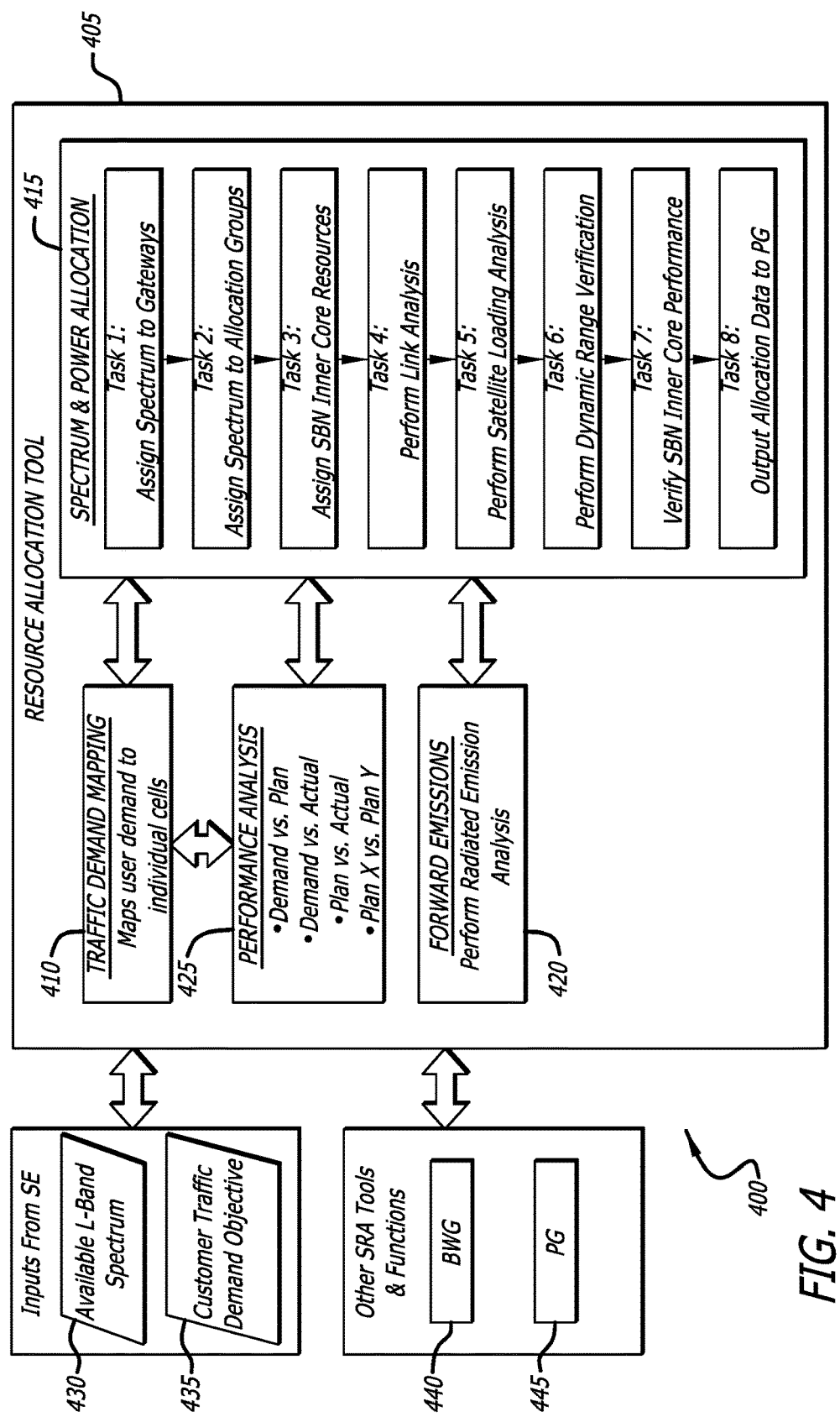
FIG. 4 is a flow diagram showing the disclosed method for integrated resource planning for satellite systems, in accordance with at least one embodiment of the present disclosure.

FIG. 1 is a schematic diagram 100 of an exemplary satellite system that may employ the disclosed method 400 for integrated resource planning for satellite systems of FIG. 4, in accordance with at least one embodiment of the present disclosure. It should be noted that various different satellite systems than the exemplary satellite system shown in FIG. 1 may employ the disclosed method 400.

In this figure, a beam map is shown comprising a plurality of L-band beams (e.g., cells) 120. It should be noted that in other embodiments, various different frequency bands (e.g., C-band, Ku-band, and Ka-band) for the beams may be used other than L-band.

Figure 3:
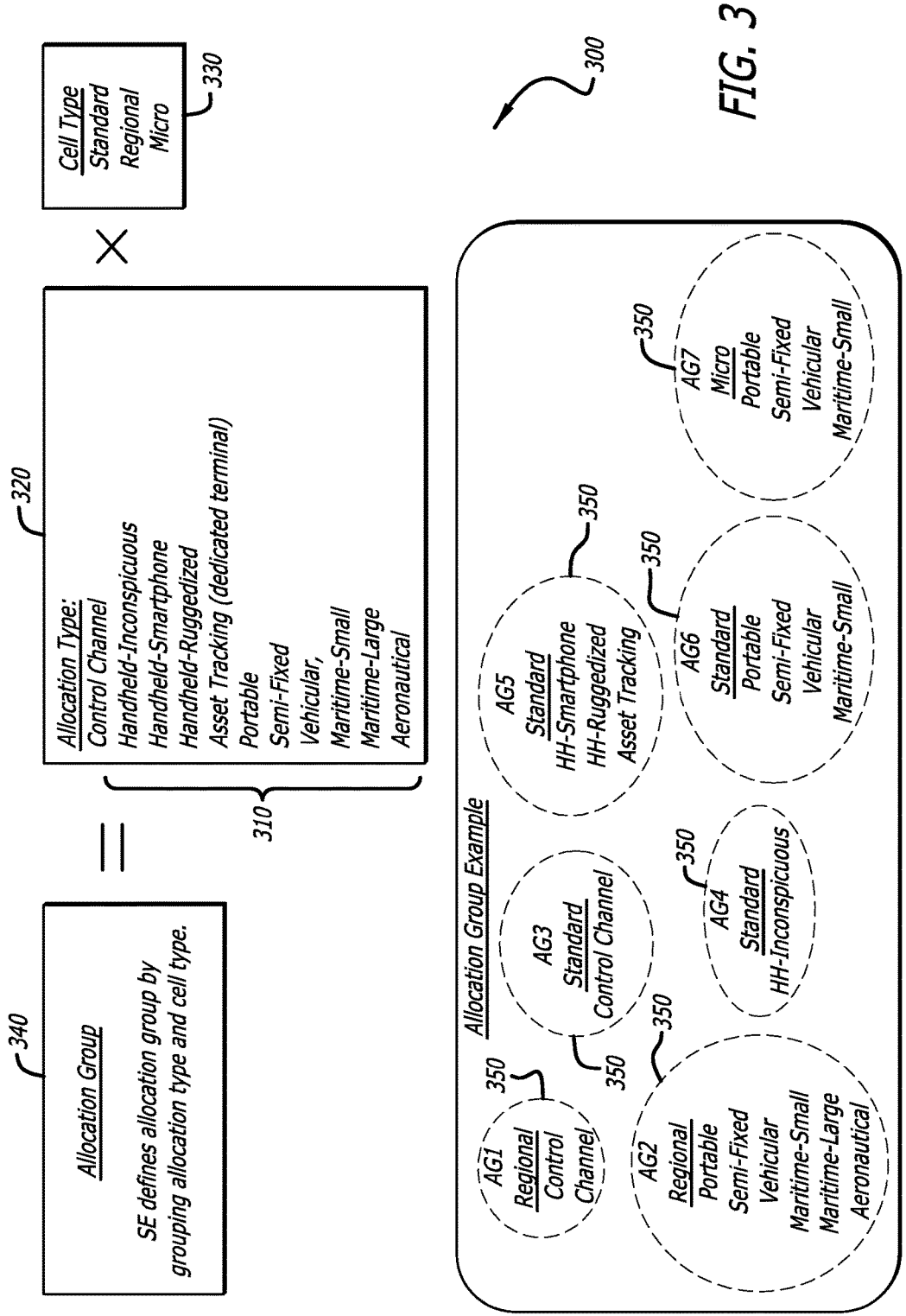
FIG. 3 is a diagram showing exemplary allocation groups comprising various exemplary terminal types and cell types, in accordance with at least one embodiment of the present disclosure.

In addition, various types of user terminals 130, which are able to communicate with each other by using the L-band beams 120, are shown. The types of user terminals that are shown are a portable laptop type device 130a, a handheld-smartphone device 130b, a maritime-small device 130c, and an aeronautical device 130d. For other embodiments, various different types of user terminals may be employed. Refer to FIG. 3 to view an exemplary listing 310 of various different types of user terminals that may be employed.

Also shown in FIG. 1 is the space-based network (SBN) inner core 140, which comprises a GEO-mobile satellite 150 transmitting and receiving L-band signals 160 from the beams 120 and transmitting and receiving Ku-band signals 170 from a gateway 155. It should be noted that although not shown, this exemplary satellite system comprises two gateways 155. In addition, it should be noted that in other embodiments, one or more than two gateways 155 may be employed. The SBN inner core 140 also comprises radio frequency equipment 165 and a ground based beam former (GBBF) 175. The SBN inner core 140 is connected to a ground communications network 180 via beamports 185, which are fiber connections that allow for the transfer of data for each beam 120 from the GBBF 175 to and from the ground communications network 180.

Also in this figure, the ground communications network 180 is shown to comprise a satellite base station subsystem (SBSS) 185, a core network 190, as well as value added services 195, such as asset tracking, customer care and billing services (CCBS), and legal interception. The ground communications network 180 is also shown to be in communication with external networks 197.

Figure 2:
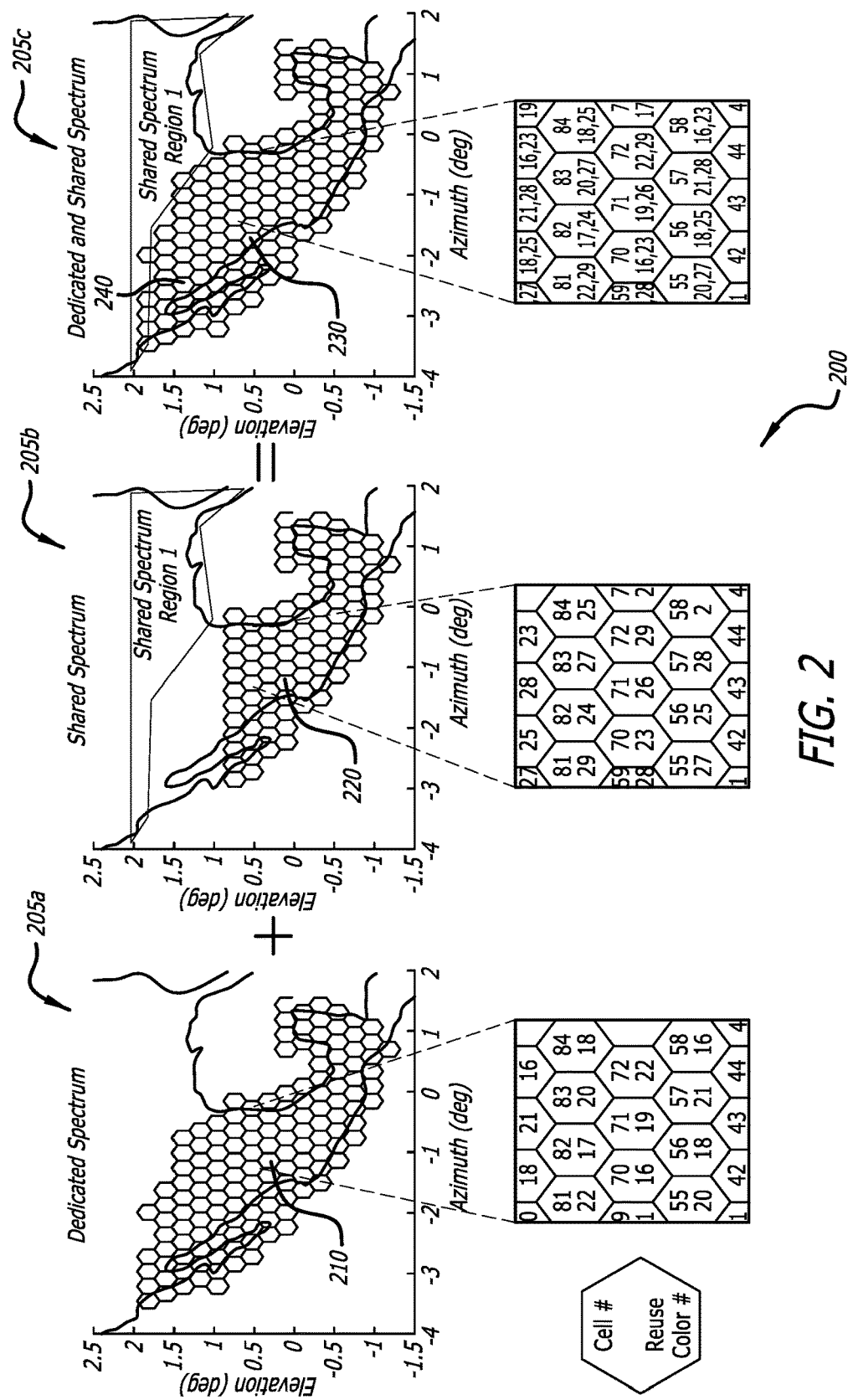
FIG. 2 is schematic diagram showing exemplary beams (i.e. cells) on beam maps for a dedicated frequency spectrum and a shared frequency spectrum, in accordance with at least one embodiment of the present disclosure.

FIG. 2 is schematic diagram 200 showing exemplary beams (i.e. cells) on beam maps 205 for a dedicated frequency spectrum and a shared frequency spectrum, in accordance with at least one embodiment of the present disclosure. In this figure, three beam maps 205a, 205b, 205c are shown. In the first beam map 205a, a plurality of beams 210 using a dedicated frequency spectrum (i.e. a frequency spectrum only used by Mexico) are shown. In the second beam map 205b, a plurality of beams 220 using a shared frequency spectrum (i.e. a frequency spectrum used by both Mexico and the United States) are shown. And, in the third beam map 205c, a plurality of beams 240 using the dedicated frequency spectrum, and a plurality of beams 230 using the dedicated frequency spectrum and the shared frequency spectrum are shown. In addition, it should be noted that the exemplary beams 210, 220, 240 utilize a seven-color reuse pattern (e.g., for map 205a, beam numbers 16-22 comprise one seven-color reuse pattern; and for map 205b, beam numbers 23-29 comprise one seven-color reuse pattern). The exemplary beams 230 utilize two sets of a seven-color reuse pattern (e.g., for map 205c, beam numbers 16-29 comprise two sets of a seven-color reuse pattern).

FIG. 3 is a diagram 300 showing exemplary allocation groups 350 comprising various exemplary terminal types 310 and cell types 330, in accordance with at least one embodiment of the present disclosure. In this figure, a system engineer (SE) defines allocation groups 340 by grouping allocation types 320 (i.e. a control channel and/or terminal types 310) with cell types 330. The terminal types 310 comprise, for example, handheld-inconspicuous devices, handheld-smartphone devices, handheld-ruggedized devices, asset tracking devices, portable devices, semi-fixed devices, vehicular devices, maritime-small devices, maritime-large devices, and aeronautical devices. It should be noted that in other embodiments, various different terminal types may be used other than the terminal types 310 shown in this figure. The cell types 330 comprise standard cells, regional cells (i.e. larger sized cells than the standard cells), and micro cells (i.e. smaller sized cells than the standard cells). In other embodiments, various different cell types may be used other than the cell types 330 shown in this figure.

Once, the SE has defined the allocation groups 350, each allocation group 350 (e.g., AG5) will comprise a cell type (e.g., standard), and allocation types, such as terminal types (e.g., handheld-smartphone, handheld-ruggedized, and asset tracking devices).

FIG. 4 is a flow diagram showing the disclosed method 400 for integrated resource planning for satellite systems, in accordance with at least one embodiment of the present disclosure. In this figure, in particular, the various different processes of the disclosed resource allocation (RA) tool 405 are depicted. The resource allocation tool 405, which is run on at least one computer, is shown to include four main processes: the traffic demand (TD) mapping process 410, the spectrum and power allocation process (SPA) 415, the forward emissions process 420, and the performance analysis process 425.

The traffic demand mapping process 410 maps user demand to individual beams (e.g., cells). The SPA process 415 comprises eight tasks. In particular, for the SPA process 415, Task 1 assigns a frequency spectrum for each gateway, Task 2 assigns a frequency spectrum to each allocation group, Task 3 assigns the space-based network (SBN) inner core resources, Task 4 performs a link analysis, Task 5 performs a satellite loading analysis, Task 6 performs a dynamic range verification, Task 7 verifies the SBN inner core performance, and Task 8 outputs allocation data to a profile generator (PG) to generate a configuration profile for the satellite system. The forward emissions process 420 performs a radiated emission analysis to check for possible frequency spillover in neighboring regions. And, the performance analysis process 425 analyzes and compares the traffic demand verses a generated configuration profile, the traffic demand versus actual demand (e.g., obtained from statistics), a generated configuration profile versus actual demand, and/or a first configuration profile versus a second configuration profile.

Also shown in this figure are various inputs into and outputs from the resource allocation tool 405. From the SE, the available L-band frequency spectrum 430 and the customer traffic demand objective 435 (e.g., refer to FIG. 2) are input into the resource allocation tool 405. In addition, other system resource allocation (SRA) tools and functions (e.g., a beam weight generator (BWG) 440, and a profile generator (PG) 445, which are both run on at least one computer) generate inputs for the resource allocation tool 405 and/or receive outputs from the resource allocation tool 405.

Figure 5:
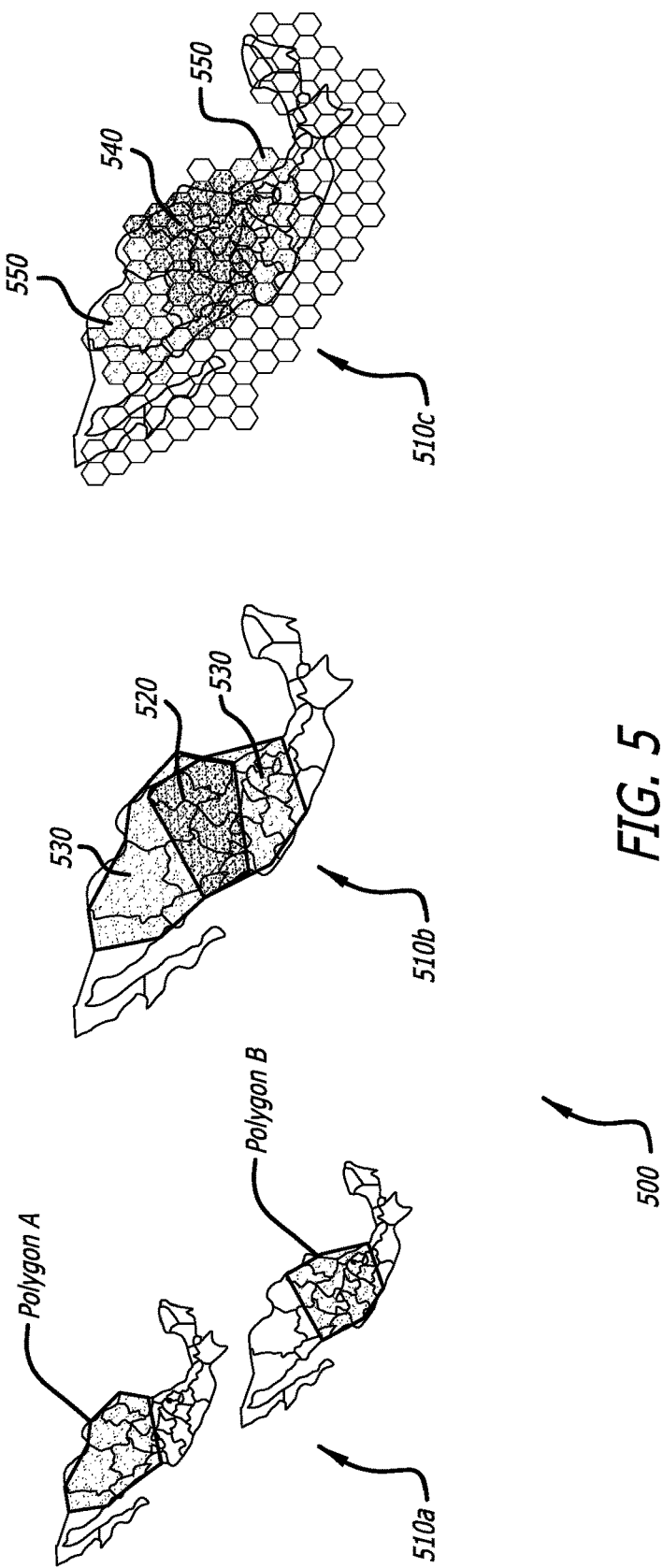
FIG. 5 is a diagram depicting the traffic demand mapping process of the disclosed method for integrated resource planning for satellite systems of FIG. 4, in accordance with at least one embodiment of the present disclosure.

FIG. 5 is a diagram 500 depicting the traffic demand mapping process of the disclosed method 400 for integrated resource planning for satellite systems of FIG. 4, in accordance with at least one embodiment of the present disclosure. In this figure, a SE receives regions, which are defined by polygons, for user communication demand. Three maps 510 are depicted to show exemplary user communication demand for an area and the mapping of cells according to that demand. In map 510a, polygon A shows a region defined by a polygon for communication demand for the army, and polygon B shows a region defined by a polygon for communication demand for the police.

A traffic demand aggregation tool, run on at least one computer, obtains the regions defined by polygons from the SE, and performs traffic demand mapping by first aggregating the polygons. Map 510b shows the polygons (i.e. polygon A and polygon B) aggregated together. The overlap region 520 of polygon A and polygon B has a higher demand than the non-overlapped regions 530 of polygon A and polygon B. The traffic demand aggregation tool performs traffic demand mapping by then mapping beams (i.e. cells) to the polygons according to the demand. Map 510c shows the beam map comprising the mapped beams. In particular, map 510c shows the beams for the aggregated high level demand 540, and the beams for the aggregated low level demand 550.

Figure 6:
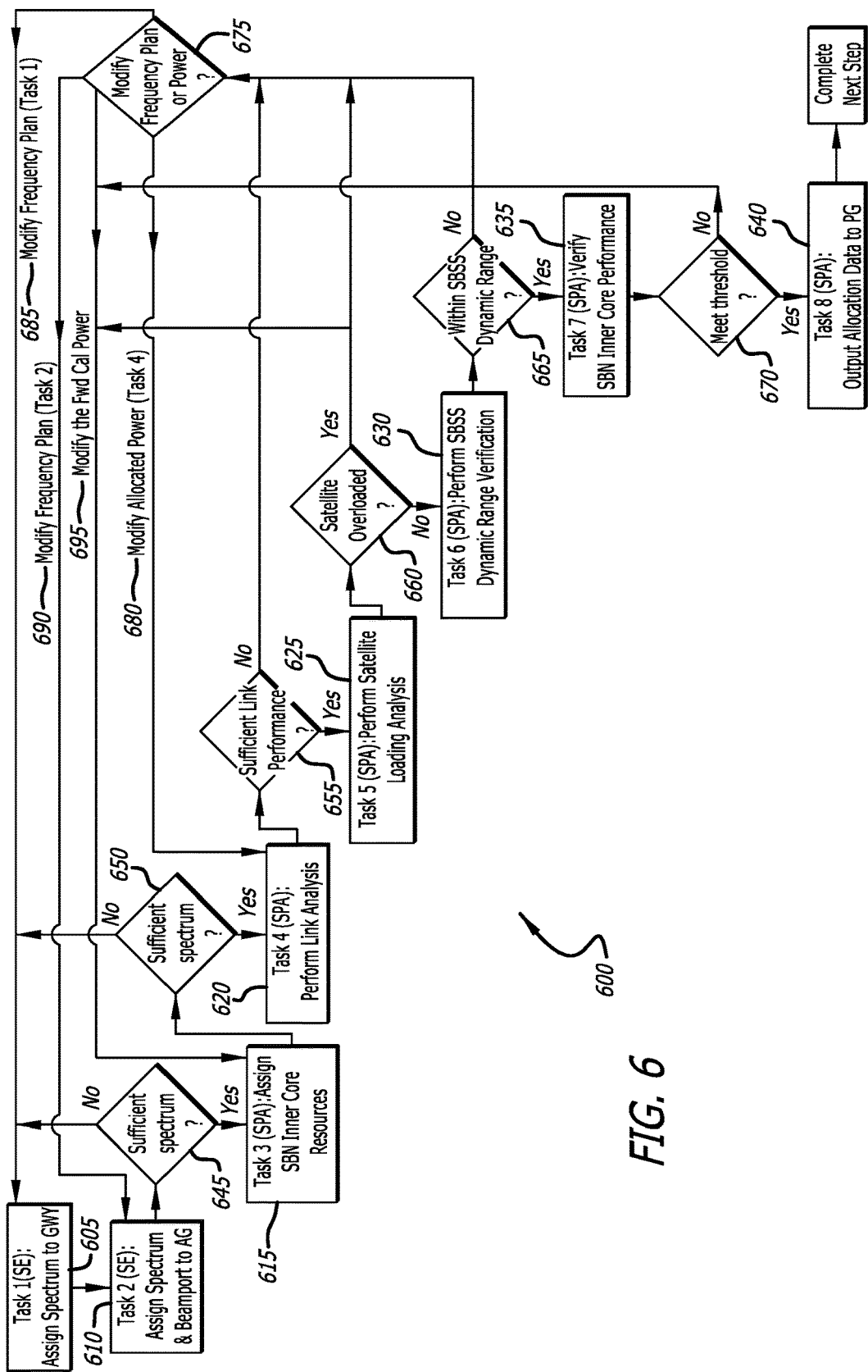
FIG. 6 is a flow chart showing the disclosed spectrum and power allocation (SPA) process of the disclosed method for integrated resource planning for satellite systems of FIG. 4, in accordance with at least one embodiment of the present disclosure.

FIG. 6 is a flow chart showing the disclosed spectrum and power allocation (SPA) process 600 of the disclosed method 400 for integrated resource planning for satellite systems of FIG. 4, in accordance with at least one embodiment of the present disclosure. It should be noted that the Tasks of the SPA process 600 will be discussed in more detail in the descriptions of FIGS. 7-15.

The SPA process 600 is performed by a SPA tool, which is run on at least one computer. At the start of this process 600, Task 1 assigns a frequency spectrum (i.e. a gateway frequency spectrum) to each gateway 605. Then, Task 2 assigns a frequency spectrum (i.e. a allocation group frequency spectrum) to each allocation group (AG) 610. The process 600 then determines whether the allocation group frequency spectrum is sufficient 645. If the frequency spectrum is determined not to be sufficient, the process 600 returns to Task 1 605.

If the frequency spectrum is determined to be sufficient, the process proceeds to Task 3 615. Task 3 assigns the SBN inner core resources 615. The process 600 then determines whether the allocation group frequency spectrum is sufficient 650. If the frequency spectrum is determined not to be sufficient, the process 600 returns to Task 1 605.

If the frequency spectrum is determined to be sufficient, the process proceeds to Task 4 620. Task 4 performs a link analysis 620. The process 600 then determines whether the link performance is sufficient 655. If the link performance is determined not to be sufficient, the process 600 determines whether to modify the frequency plan or to modify the power 675. If the process 600 determines to modify the frequency plan, the process 600 returns to either Task 1 605 to modify the frequency plan 685 (e.g., for a big modification), or to Task 2 610 to modify the frequency plan 690 (e.g., for a small modification). However, if the process 600 determines to modify the power, the process 600 then returns to Task 3 615 to modify the forward calibration power setting 695 or to Task 4 620 to modify the allocation power 680.

If the link performance is determined to be sufficient, the process proceeds to Task 5 625. Task 5 performs a satellite loading analysis 625. The process 600 then determines whether the satellite is overloaded 660. If it is determined that the satellite is overloaded, the process 600 determines whether to modify the frequency plan or to modify the power 675. If the process 600 determines to modify the frequency plan, the process 600 returns to either Task 1 605 to modify the frequency plan 685 (e.g., for a big modification), or to Task 2 610 to modify the frequency plan 690 (e.g., for a small modification). However, if the process 600 determines to modify the power, the process 600 then returns to Task 4 620 to modify the allocation power 680 or to Task 3 615 to modify the forward calibration power setting 695.

If it is determined that the satellite is not overloaded, the process proceeds to Task 6 630. Task 6 performs space-based satellite subsystem (SBSS) dynamic range verification 630. The process 600 then determines whether the SBSS is within dynamic range 665. If it is determined that the SBSS is not within dynamic range, the process 600 determines whether to modify the frequency plan or to modify the power 675. If the process 600 determines to modify the frequency plan, the process 600 returns to either Task 1 605 to modify the frequency plan 685 (e.g., for a big modification), or to Task 2 610 to modify the frequency plan 690 (e.g., for a small modification). However, if the process 600 determines to modify the power, the process 600 then returns to Task 4 620 to modify the allocation power 680 or to Task 3 615 to modify the forward calibration power setting 695.

If it is determined that the satellite is within dynamic range, the process proceeds to Task 7 635. Task 7 verifies space based network (SBN) inner core performance 635. The process 600 then determines whether the SBN inner core performance threshold is met 670. If it is determined that the threshold is not met, the process 600 returns to Task 3 615.

If it is determined that the threshold is met, the process 600 proceeds to Task 8 640. Task 8 outputs allocation data to a profile generator (PG). The PG, which is run on at least one computer, uses the allocation data to generate at least one configuration profile for the satellite system.

Figure 7:
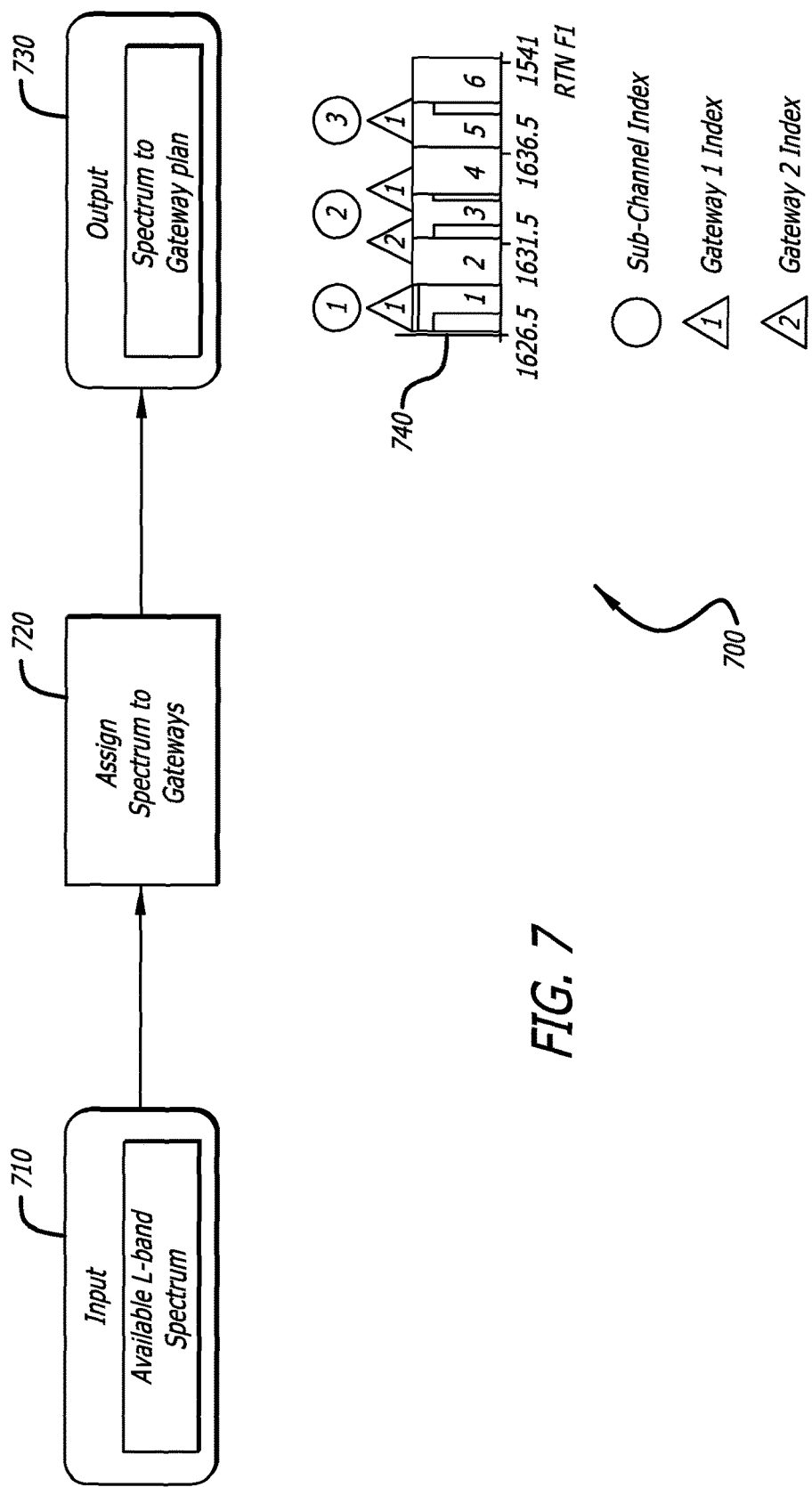
FIG. 7 is a diagram showing Task 1 (Assign Spectrum to Gateways) of the disclosed spectrum and power allocation (SPA) process of FIG. 6, in accordance with at least one embodiment of the present disclosure.

FIG. 7 is a diagram 700 showing Task 1 (Assign Spectrum to Gateways) of the disclosed spectrum and power allocation (SPA) process 600 of FIG. 6, in accordance with at least one embodiment of the present disclosure. For this Task, the available L-band spectrum is used as an input 710 by the SPA tool to assign 720 a gateway frequency spectrum to each gateway (e.g., Gateway 1 and Gateway 2) to generate 730 (i.e. output) a gateway frequency spectrum plan 740.

Figure 8:
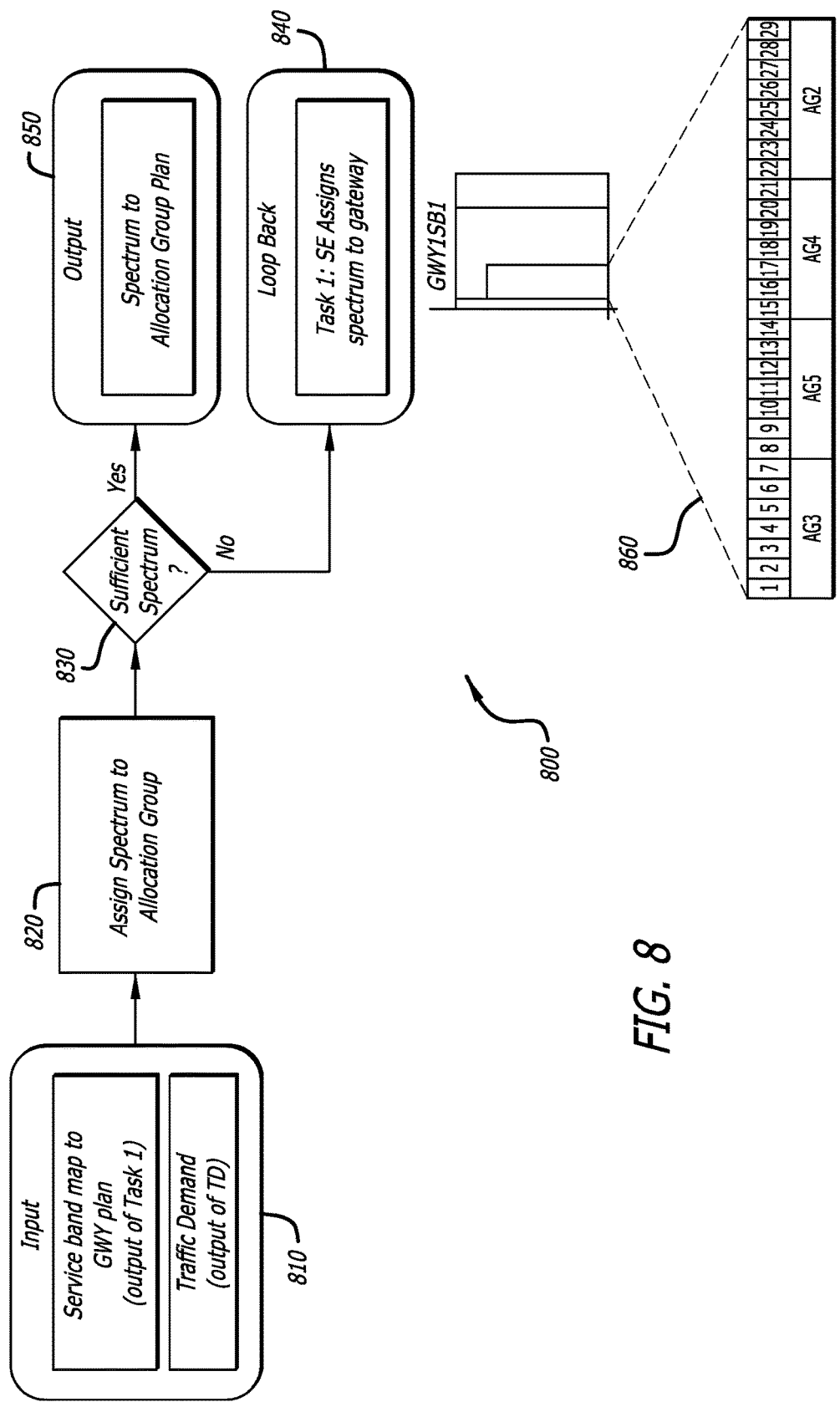
FIG. 8 is a diagram showing Task 2, Part A (Assign Spectrum to Allocation Groups) of the disclosed spectrum and power allocation (SPA) process of FIG. 6, in accordance with at least one embodiment of the present disclosure.

FIG. 8 is a diagram 800 showing Task 2, Part A (Assign Spectrum to Allocation Groups) of the disclosed spectrum and power allocation (SPA) process 600 of FIG. 6, in accordance with at least one embodiment of the present disclosure. For this Task, the gateway frequency spectrum plan 740 (refer to FIG. 7) and the traffic demand beam map 510c (refer to FIG. 5) are used as inputs 810 by the SPA tool to assign 820 an allocation group spectrum to each allocation group (AG). Once an allocation group spectrum is assigned to each allocation group, the SPA tool determines whether the allocation group frequency spectrum is sufficient 830. If it is determined that the spectrum is not sufficient, the tool returns 840 to Task 1 (refer to FIG. 7). However, if it is determined that the spectrum is sufficient, the tool outputs 850 an allocation group frequency plan 860.

Figure 9:
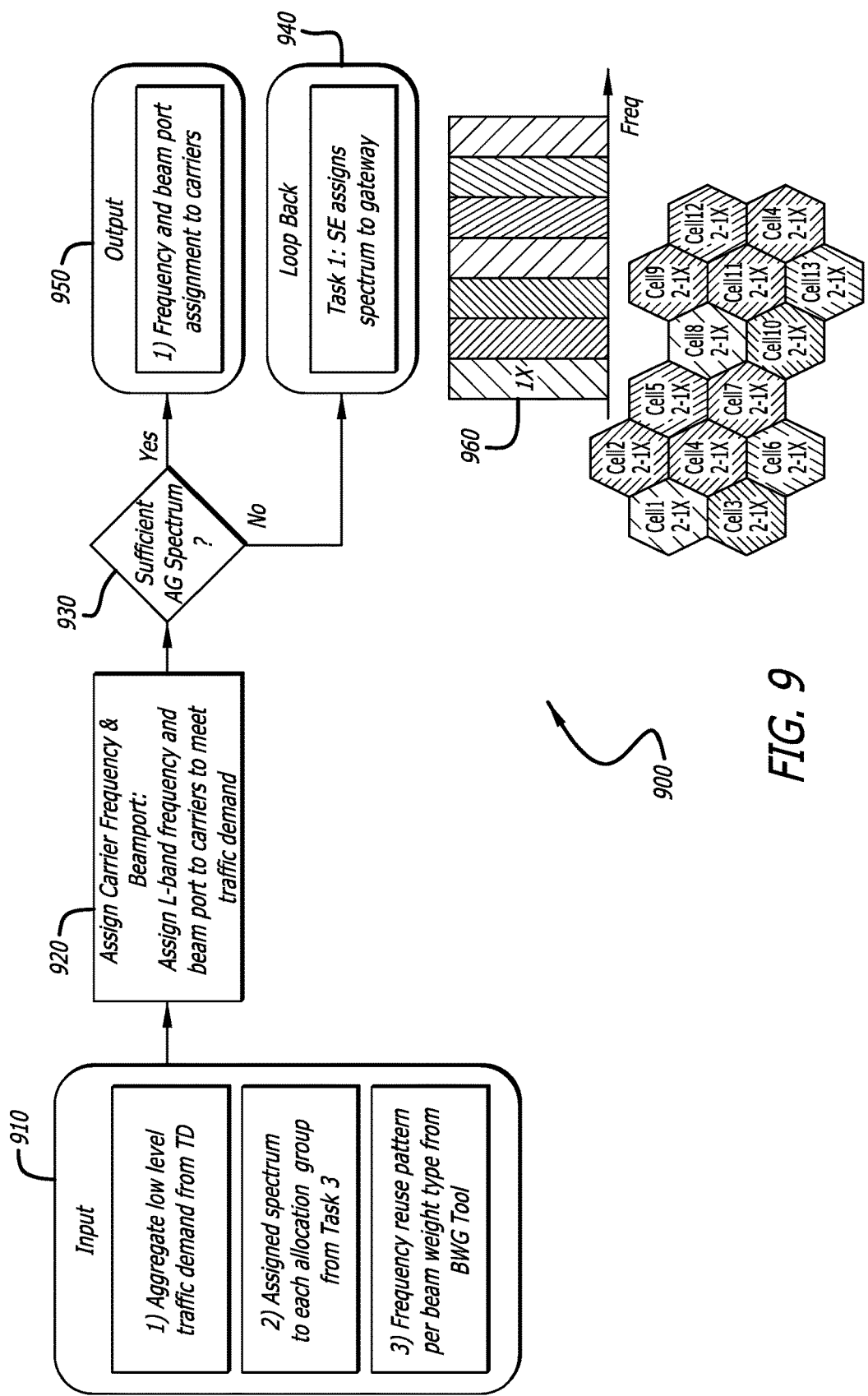
FIG. 9 is a diagram showing Task 2, Part B (Assign Carrier Frequency and Beamport) of the disclosed spectrum and power allocation (SPA) process of FIG. 6, in accordance with at least one embodiment of the present disclosure.

FIG. 9 is a diagram 900 showing Task 2, Part B (Assign Carrier Frequency and Beamport) of the disclosed spectrum and power allocation (SPA) process 600 of FIG. 6, in accordance with at least one embodiment of the present disclosure. For this Task, the aggregate traffic demand 540 and 550 from the traffic demand beam map 510c (refer to FIG. 5), the allocation group frequency plan 860 (refer to FIG. 8), and the frequency reuse pattern per beam weight type, generated by the beam weight generator (BWG) tool, are used as inputs 910 by the SPA tool to assign 920 a L-band frequency and beam port to a carrier for each beam to meet the traffic demand (i.e. to meet the desired data rate for each beam). The SPA tool then determines whether the allocation group frequency spectrum is sufficient 930. If it is determined that the spectrum is not sufficient, the tool returns 940 to Task 1 (refer to FIG. 7). However, if it is determined that the spectrum is sufficient, the tool outputs 950 a frequency and beam port assignment for the carriers 960.

Figure 10:
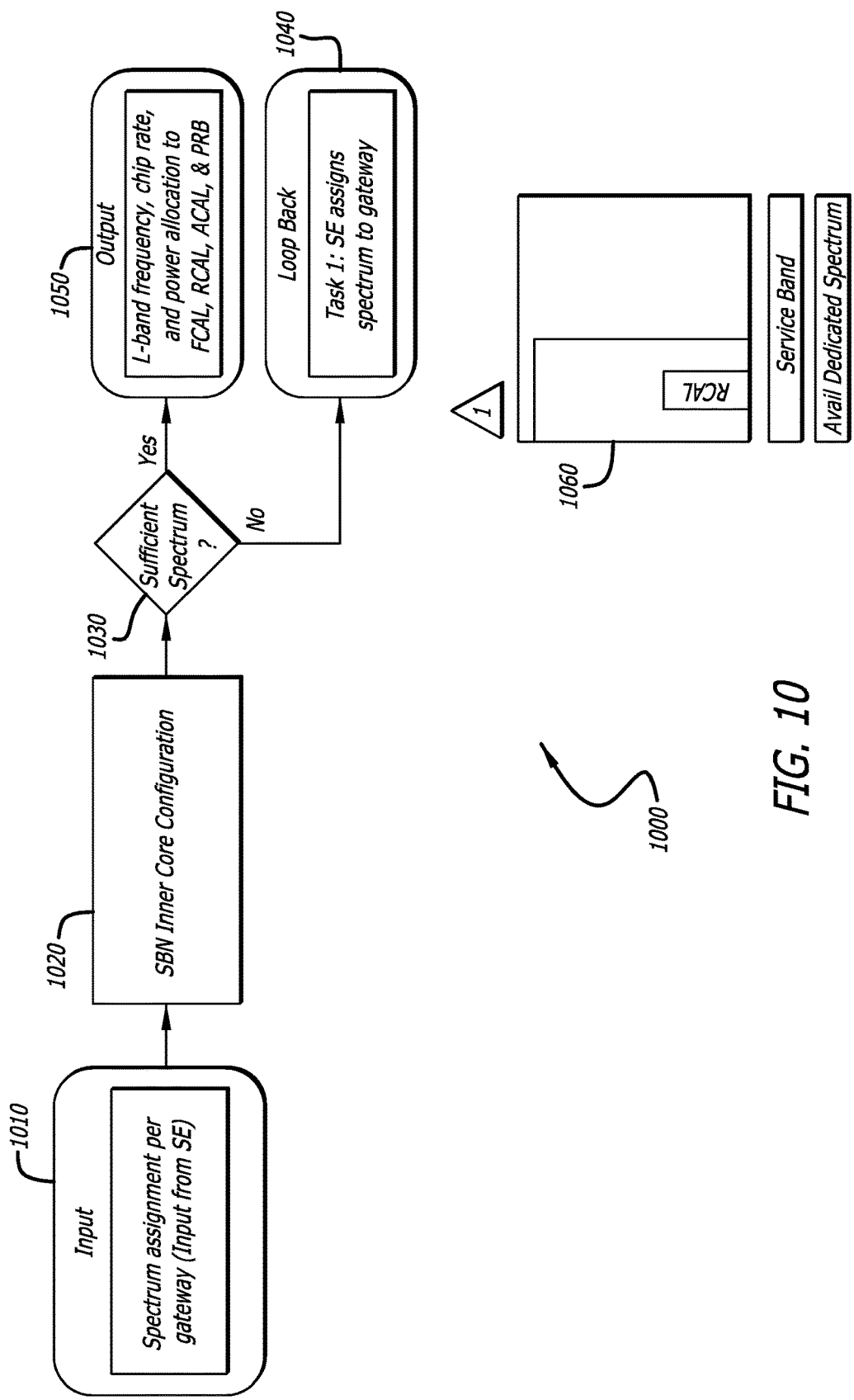
FIG. 10 is a diagram showing Task 3 (Assign Space-Based Network (SBN) Inner Core Resources) of the disclosed spectrum and power allocation (SPA) process of FIG. 6, in accordance with at least one embodiment of the present disclosure.

FIG. 10 is a diagram 1000 showing Task 3 (Assign Space-Based Network (SBN) Inner Core Resources) of the disclosed spectrum and power allocation (SPA) process 600 of FIG. 6, in accordance with at least one embodiment of the present disclosure. For this Task, the frequency spectrum assignment for each gateway is used as an input 1010 by the SPA tool to assign 1020 the SBN inner core configuration (e.g., the chip rate, the frequency, and the power to the forward calibration (FCAL) signal, the return calibration (RCAL) signal, the absolute calibration (ACAL) signal, and the pointing reference beacon (PRB) signal (i.e. the beam pointing signal)). The SPA tool then determines whether the available spectrum is sufficient 1030. If it is determined that the spectrum is not sufficient, the tool returns 1040 to Task 1 (refer to FIG. 7). However, if it is determined that the spectrum is sufficient, the tool outputs 1050 the L-band frequency, the chip rate, and the power allocation to the FCAL, RCAL, ACAL, and PRB signals (e.g., outputs the service band frequency spectrum (e.g., including the RCAL signal) 1060 for each gateway).

Figure 11:
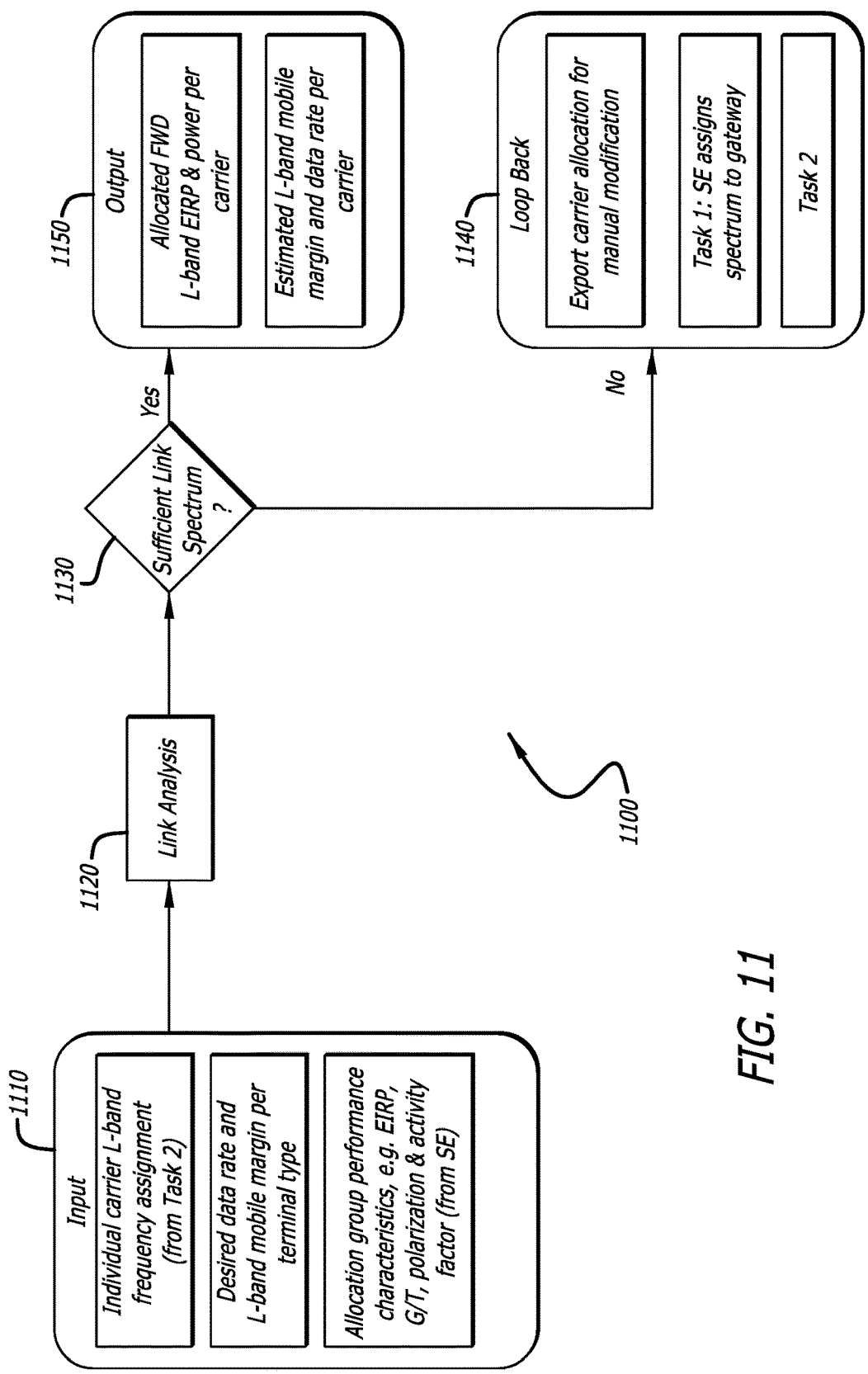
FIG. 11 is a diagram showing Task 4 (Perform Link Analysis) of the disclosed spectrum and power allocation (SPA) process of FIG. 6, in accordance with at least one embodiment of the present disclosure.

FIG. 11 is a diagram 1100 showing Task 4 (Perform Link Analysis) of the disclosed spectrum and power allocation (SPA) process 600 of FIG. 6, in accordance with at least one embodiment of the present disclosure. For this Task, the frequency assignment for the carriers 960 (refer to FIG. 9), the desired data rate and L-band mobile margin per terminal type, and the allocation group performance characteristics (e.g., effective isotropic radiated power (EIRP), gain over temperature (G/T), polarization, and activity factor) are used as inputs 1110 by the SPA tool to perform a link analysis 1120 (e.g., optimize forward L-band EIRP to achieve the desired L-band mobile margin, estimate the return L-band margin, estimate the forward and return data rate, export the carrier assignment data in a spreadsheet to the SE for manual modification, and re-assess carrier assignment data and estimate L-band margin and data rate). The SPA tool then determines whether the link performance is sufficient 1130. If it is determined that the link performance is not sufficient, the tool exports the carrier assignment data in a spreadsheet to the SE for manual modification, or the tool returns 1140 to Task 1 (refer to FIG. 7) or 800 to Task 2 (refer to FIG. 8). However, if it is determined that the link performance is sufficient, the tool outputs 1150 the allocated forward L-band EIRP and power per carrier and the estimated L-band mobile margin and data rate per carrier.

Figure 12:
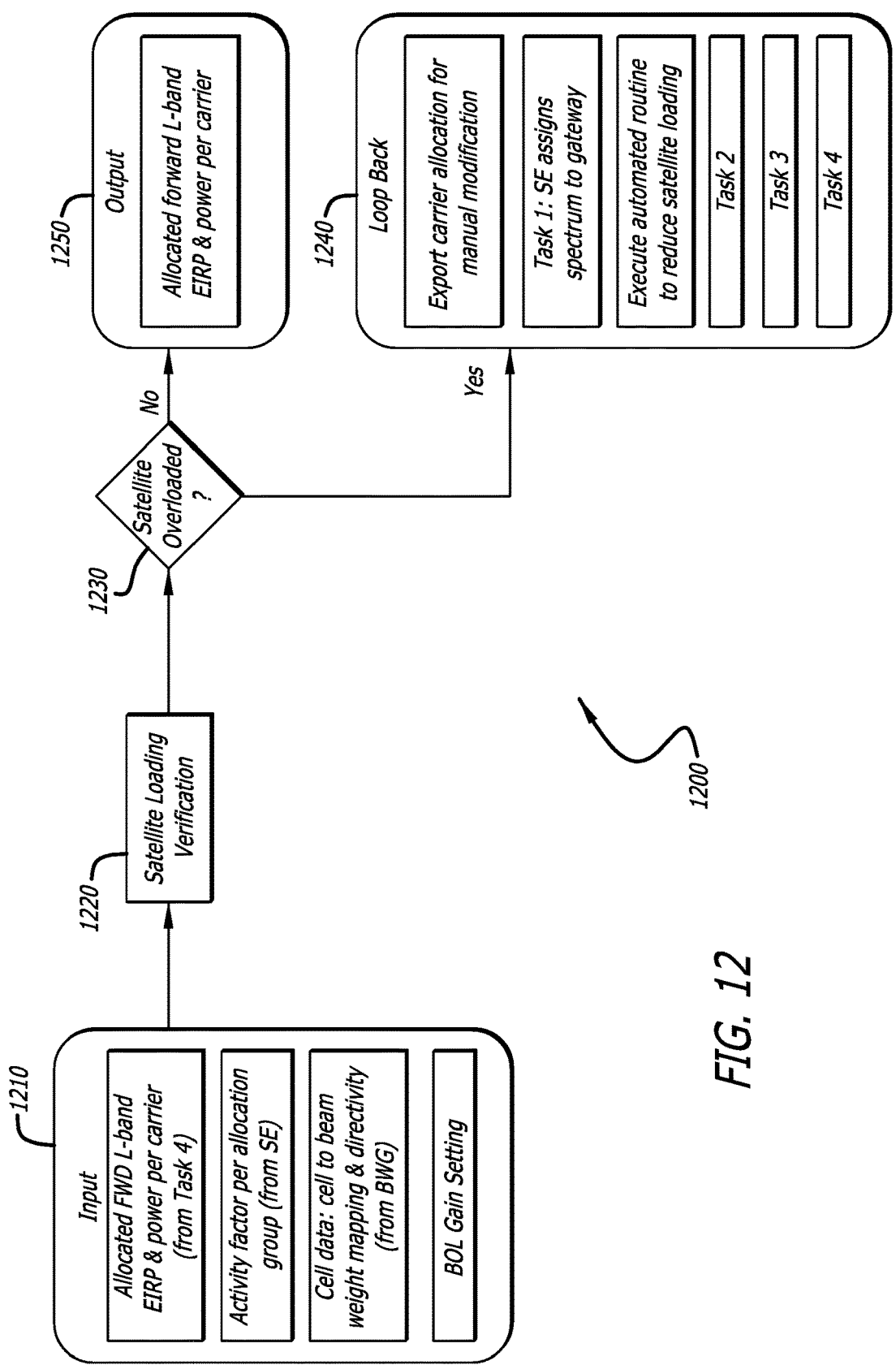
FIG. 12 is a diagram showing Task 5 (Satellite Loading Verification) of the disclosed spectrum and power allocation (SPA) process of FIG. 6, in accordance with at least one embodiment of the present disclosure.

FIG. 12 is a diagram 1200 showing Task 5 (Satellite Loading Verification) of the disclosed spectrum and power allocation (SPA) process 600 of FIG. 6, in accordance with at least one embodiment of the present disclosure. For this Task, the allocated forward L-band EIRP and power per carrier (from Task 4), the activity factor per allocation group from the SE, the cell data (i.e. cell to beam mapping and directivity from the BWG) are used as inputs 1210 by the SPA tool to perform satellite loading verification 1220 (e.g., calculate aggregate SSPAs loading; if SSPAs are overloaded, reduce carrier power or remove carrier; calculate diplexer loading; and if diplexer is overloaded, reduce carrier power or remove carrier). The SPA tool then determines whether the satellite (i.e. satellite components, such as SSPAs and diplexers) is overloaded 1230. If it is determined that the satellite is overloaded, the tool can run an automated routine to reduce the satellite loading or can export the carrier assignment data in a spreadsheet to the SE for manual modification, or the tool returns 1240 to Task 1 (refer to FIG. 7), Task 2 (refer to FIGS. 8 and 9), Task 3 (refer to FIG. 10), or Task 4 (refer to FIG. 11). However, if it is determined that the satellite is not overloaded, the tool outputs 1250 the allocated forward L-band EIRP and power per carrier.

Figure 13:
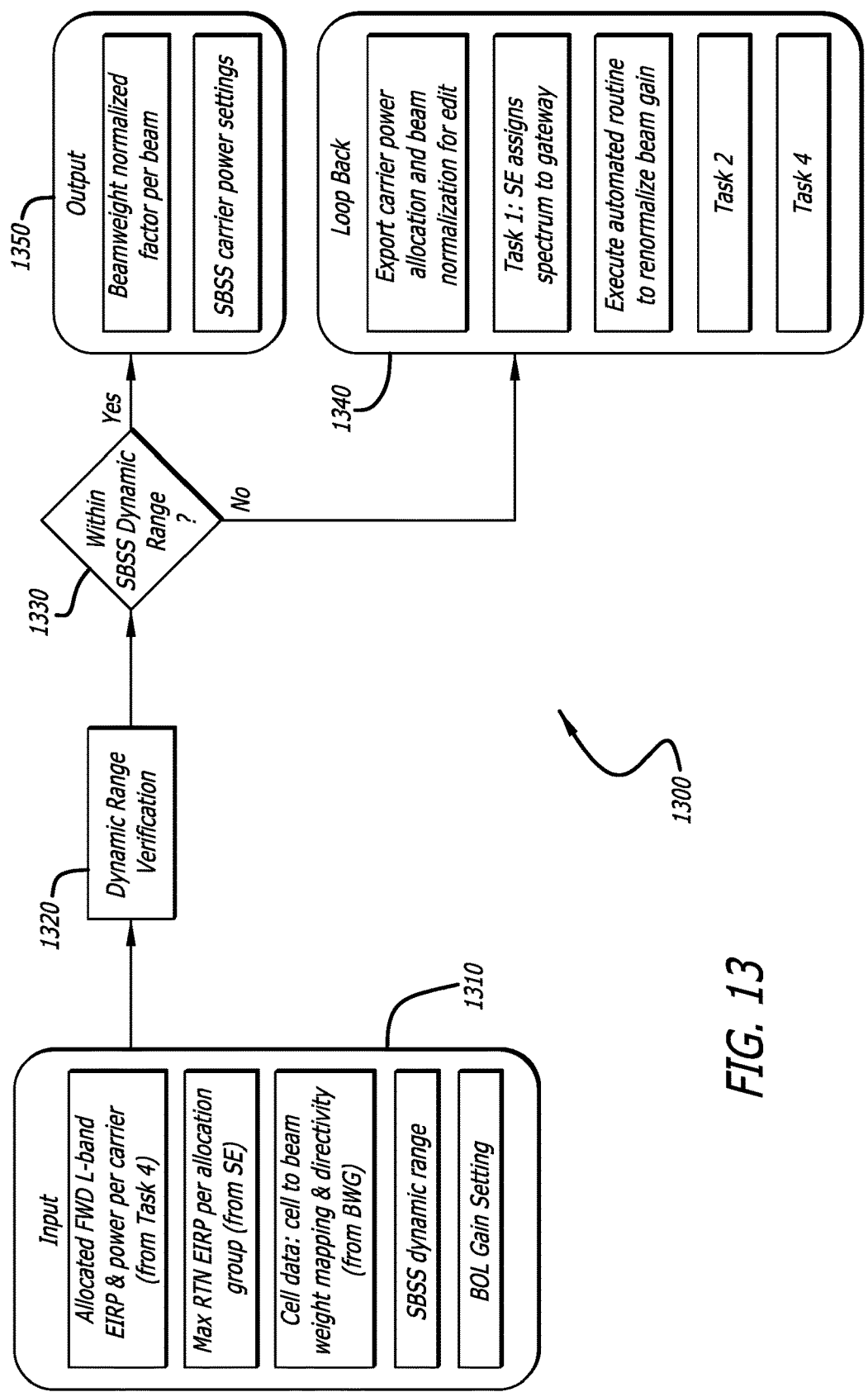
FIG. 13 is a diagram showing Task 6 (Perform Space-Based Satellite Subsystem (SBSS) Dynamic Range Verification) of the disclosed spectrum and power allocation (SPA) process of FIG. 6, in accordance with at least one embodiment of the present disclosure.

FIG. 13 is a diagram 1300 showing Task 6 (Perform Space-Based Satellite Subsystem (SBSS) Dynamic Range Verification) of the disclosed spectrum and power allocation (SPA) process 600 of FIG. 6, in accordance with at least one embodiment of the present disclosure. For this Task, the allocated forward L-band EIRP and power per carrier (from Task 4), the maximum return EIRP per allocation group from the SE, the cell data (i.e. cell to beam weight mapping and directivity from the BWG), the SBSS dynamic range, and the beginning of life (BOL) gain setting are used as inputs 1310 by the SPA tool to perform dynamic range verification 1320 (e.g., determine beamweight normalization; if SBSS dynamic range is exceeded, execute an automated routine to re-normalize the beam gain or export the carrier assignment data to a spreadsheet for manual modification; and assign SBSS carrier power setting). The SPA tool then determines whether the SBSS is within dynamic range (i.e. determine whether any SBSS components are overloaded) 1330. If it is determined that the SBSS is not within dynamic range, the tool can execute an automated routine to re-normalize the beam gain or export the carrier assignment data to a spreadsheet for manual modification, then the carrier assignment is re-assessed and the L-band margin and data rate are estimated, or the tool returns 1340 to Task 1 (refer to FIG. 7), Task 2 (refer to FIGS. 8 and 9), or Task 4 (refer to FIG. 11). However, if it is determined that the SBSS is within dynamic range, the tool outputs 1350 the beamweight normalization factor per beam and the SBSS carrier power settings.

Figure 14:
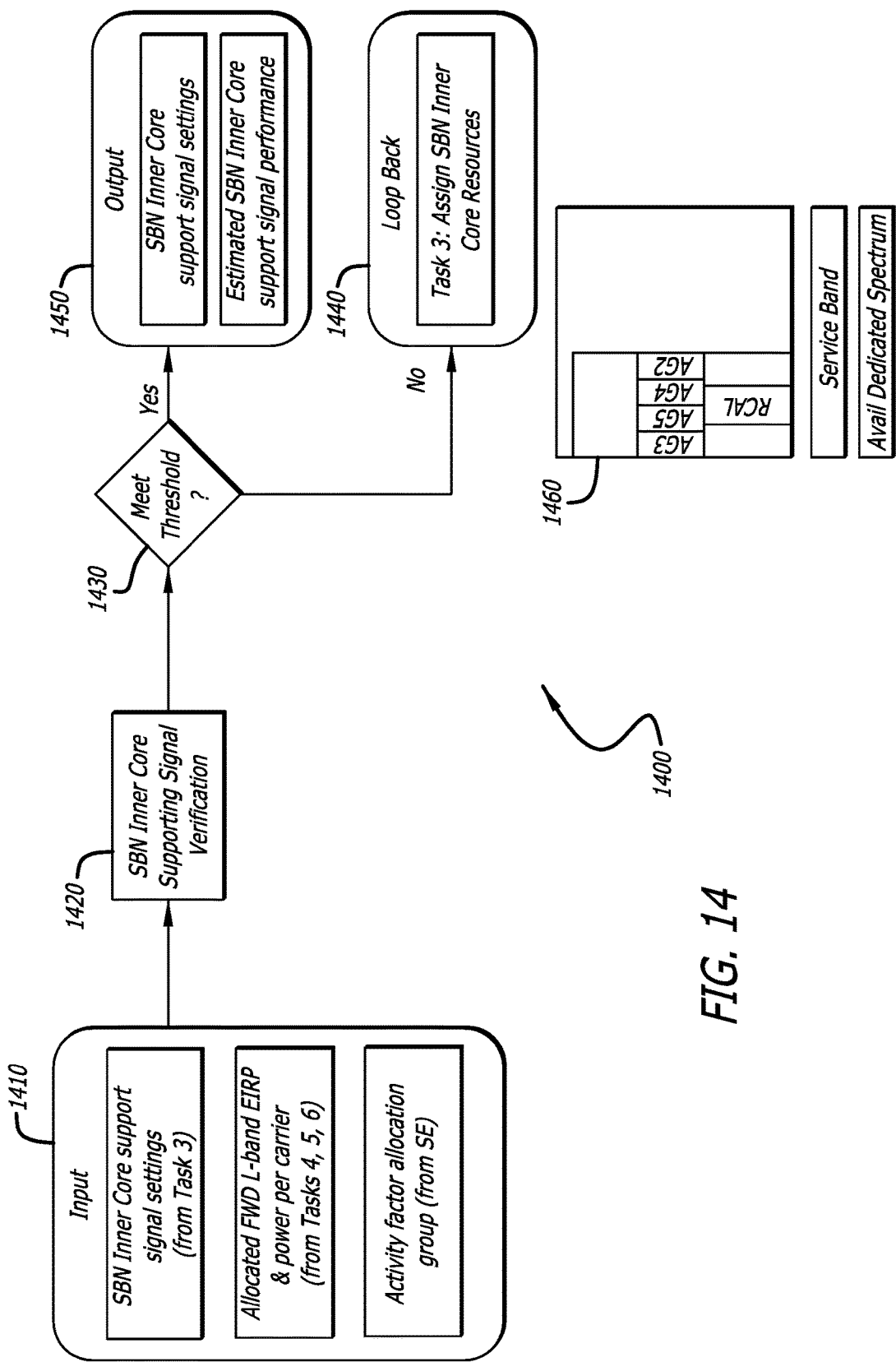
FIG. 14 is a diagram showing Task 7 (SBN Inner Core Supporting Signals Verification) of the disclosed spectrum and power allocation (SPA) process of FIG. 6, in accordance with at least one embodiment of the present disclosure.

FIG. 14 is a diagram 1400 showing Task 7 (SBN Inner Core Supporting Signals Verification) of the disclosed spectrum and power allocation (SPA) process 600 of FIG. 6, in accordance with at least one embodiment of the present disclosure. For this Task, the SBN inner core support signal settings (from Task 3), the allocated forward L-band EIRP and power per carrier (from Tasks 4, 5, and 6), and the activity factor for each allocation group from the SE are used as inputs 1410 by the SPA tool to perform SBN inner core supporting signal verification 1420 (e.g., determine how much interference the allocation group frequency spectrum is causing the service band frequency spectrum (e.g., RCAL signal), refer to frequency spectrum 1460). The SPA tool then determines whether the SBN inner core performance threshold (e.g., interference threshold) is met 1730. If it is determined that the threshold is not met, the tool returns 1440 to Task 3 (refer to FIG. 10). However, if it is determined that threshold is met, the tool outputs 1450 the SBN inner core support signal settings and the estimated SBN inner core support signal performance.

Figure 15:
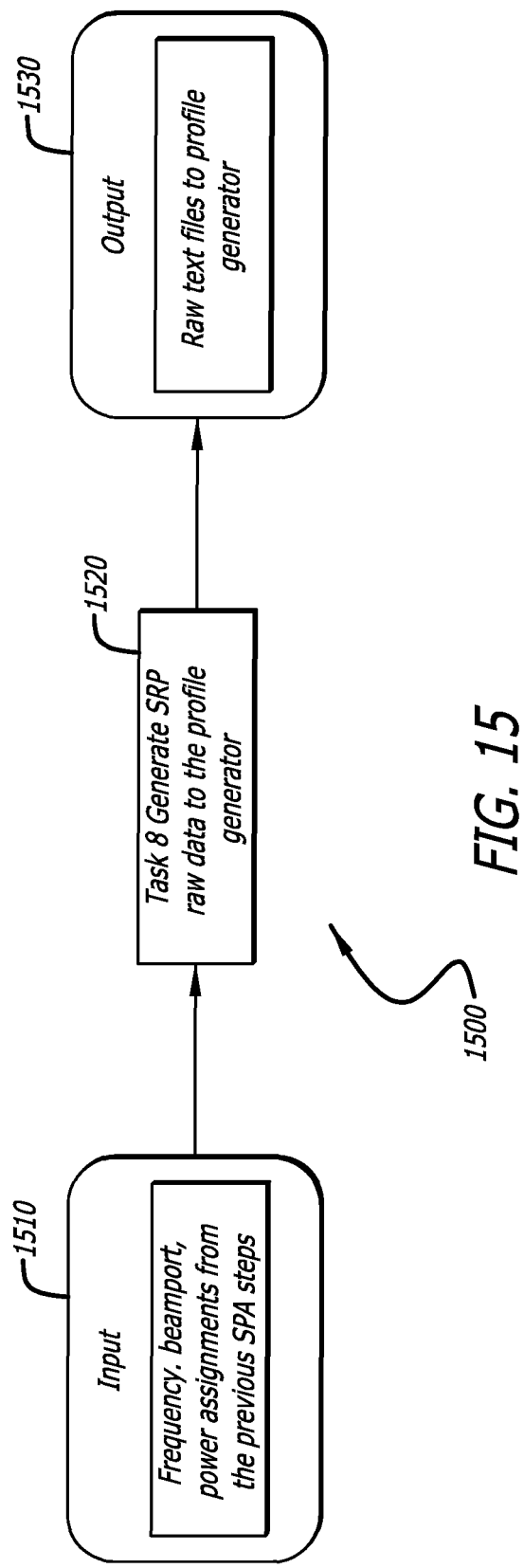
FIG. 15 is a diagram showing Task 8 (Generating Output to Profile Generator) of the disclosed spectrum and power allocation (SPA) process of FIG. 6, in accordance with at least one embodiment of the present disclosure.

FIG. 15 is a diagram 1500 showing Task 8 (Generating Output to Profile Generator) of the disclosed spectrum and power allocation (SPA) process 600 of FIG. 6, in accordance with at least one embodiment of the present disclosure. For this Task, the frequency spectrums and the beam port power assignments from the previous Tasks are used as inputs 1510 by the SPA tool to generate raw data for the profile generator (PG), which is run on at least one computer. The SPA tool then outputs 1530 raw text files to the PG, which uses the data to generate at least one configuration profile for the satellite system.

Figure 16:
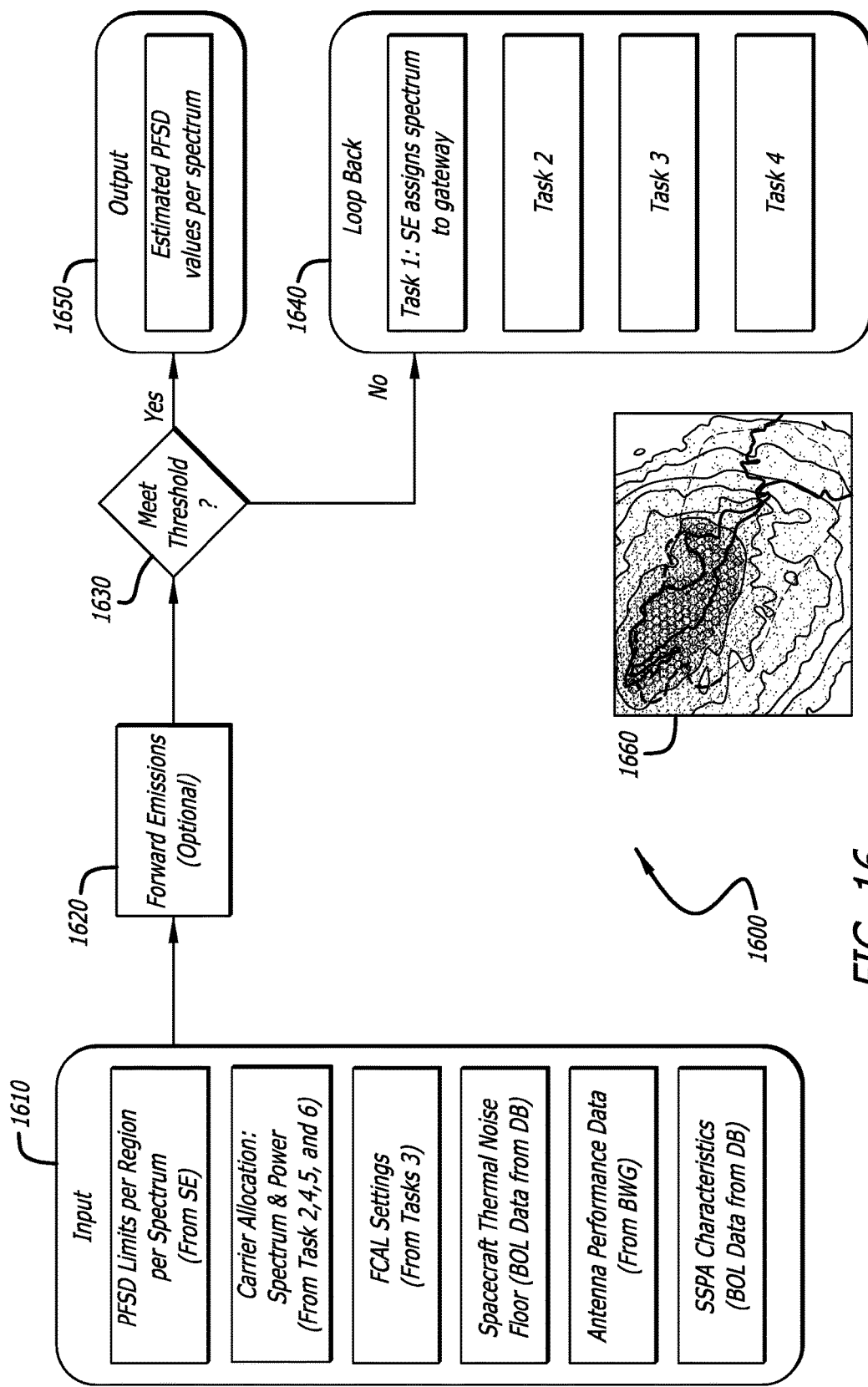
FIG. 16 is a diagram depicting the forward emissions process of the disclosed method for integrated resource planning for satellite systems of FIG. 4, in accordance with at least one embodiment of the present disclosure.

FIG. 16 is a diagram 1600 depicting the forward emissions process of the disclosed method 400 for integrated resource planning for satellite systems of FIG. 4, in accordance with at least one embodiment of the present disclosure. The forward emissions process is performed by a forward emissions tool, which is run on at least one computer. For the forward emissions process, the PFSD limits per region per frequency spectrum from the SE, the carrier allocation (i.e. frequency spectrum and power from Tasks 2, 4, 5, and 6), the FCAL settings (from Task 3), the spacecraft thermal noise floor from BOL data from a database (DB), the antenna performance data from BWG, and the SSPA characteristics from BOL data from a DB are used as inputs 1610 by the forward emissions tool to perform forward emissions 1620 (e.g., calculate traffic emissions, calculate FCAL emissions, calculate thermal noise emissions, and calculate noise power ratio (NPR) emissions) (i.e. to determine PFSD for each beam frequency spectrum to determine the frequency spillover in neighboring regions). The tool then determines whether the forward emissions threshold (e.g., spillover threshold) is met 1630. If it is determined that the threshold is not met, the user can return to SPA Task 1 (refer to FIG. 7), Task 2 (refer to FIGS. 8 and 9), Task 3 (refer to FIG. 10), or Task 4 (refer to FIG. 11). However, if it is determined that the threshold is met, the tool outputs 1650 the estimated PFSD values for each beam frequency spectrum, and optionally generates a map 1660 comprising the PFSD values.

Figure 17:
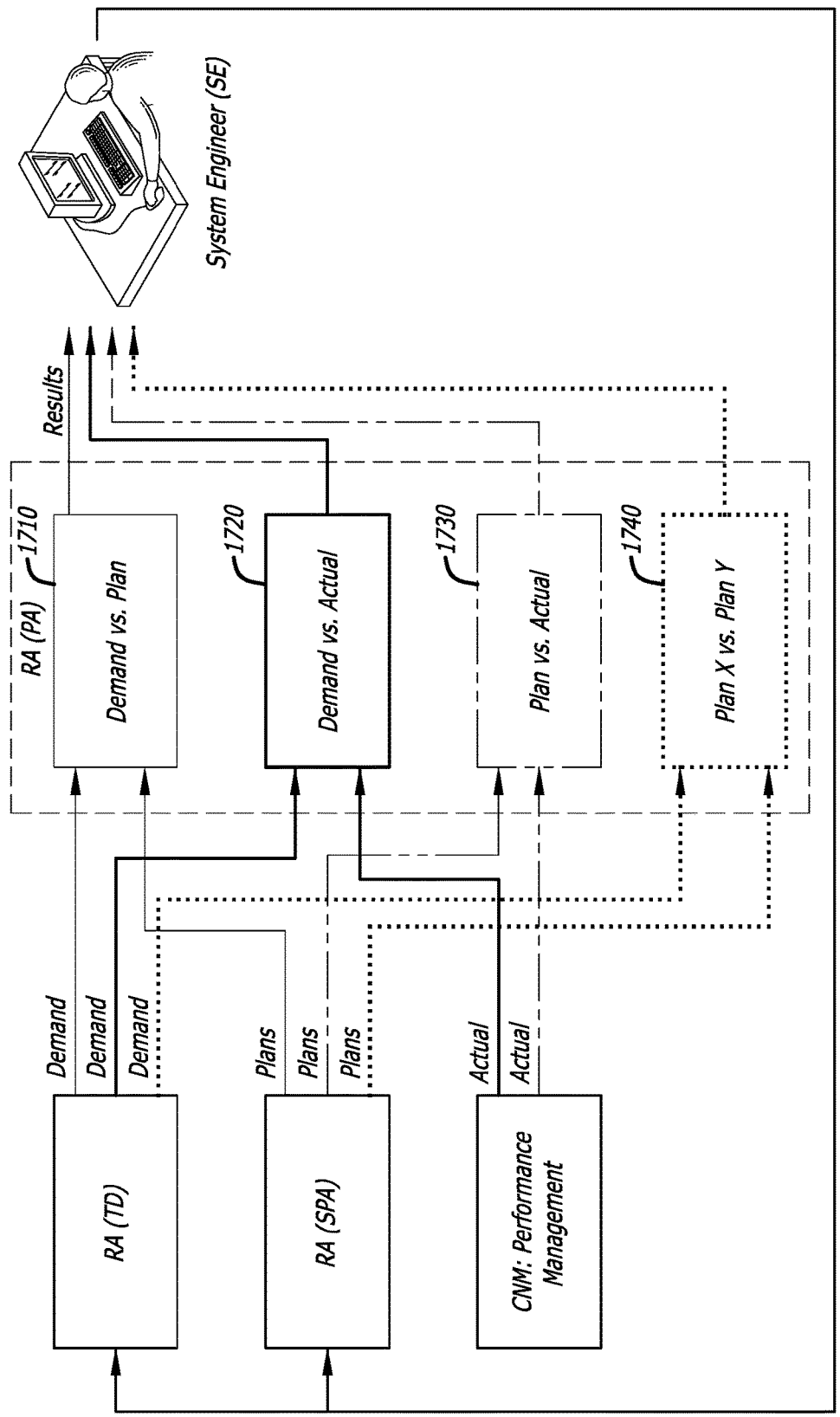
FIG. 17 is a diagram depicting the performance analysis process of the disclosed method for integrated resource planning for satellite systems of FIG. 4, in accordance with at least one embodiment of the present disclosure.

FIG. 17 is a diagram 1700 depicting the performance analysis process of the disclosed method 400 for integrated resource planning for satellite systems of FIG. 4, in accordance with at least one embodiment of the present disclosure. The performance analysis process is performed by a performance analysis tool, which is run on at least one computer. The performance analysis process, of the resource allocation (RA) tool, may perform various different types of analyses and comparisons. Types of analyses and comparisons that may be performed by the performance analysis include, but are not limited to, a comparison/analysis of the traffic demand (TD) versus a generated configuration profile (i.e. the plan) 1710, a comparison/analysis of the traffic demand versus the actual demand (from statistics) 1720, a comparison/analysis of a generated configuration profile versus the actual demand 1730, and a comparison of one generated configuration profile versus another generated configuration profile 1740.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for integrated resource planning for a satellite system, the method comprising:
    obtaining, by at least one computer, user communication demand for at least one region;
    generating, by the at least one computer, a beam map comprising at least one beam for each of the at least one region according to the user communication demand;
    generating, by the at least one computer, at least one configuration profile for the satellite system by using the beam map;
    performing, by the at least one computer, performance analysis by comparing at least one of the user communication demand versus one of the at least one configuration profile, the user communication demand versus actual communication demand, one of the at least one configuration profile versus the actual communication demand, and one of the at least one configuration profile versus another one of the at least one configuration profile; and
    configuring, based on the performing, the satellite system to allocate resources according to one or more of the configuration profiles.

2. The method of claim 1, wherein at least one of the at least one region is defined by a polygon.

3. The method of claim 2, wherein the polygon is defined by at least three points, wherein each point comprises a latitude and a longitude.

4. The method of claim 1, wherein the at least one beam is a cell.

5. The method of claim 1, wherein the generating, by the at least one computer, the at least one configuration profile comprises at least one of:
    assigning a gateway frequency spectrum for each gateway of the satellite system;
    assigning an allocation group frequency spectrum for each allocation group;
    assigning a beam frequency spectrum for each beam in the beam map;
    assigning a service band frequency spectrum for each gateway;
    assigning power for a carrier of the beam frequency spectrum for each beam to achieve at least one of a desired data rate and link margin for each beam;
    verifying that the assigned power will not overdrive any components on the satellite;
    verifying that the assigned power will not overdrive any components on each gateway; and
    estimating an amount of interference the allocation group frequency spectrums are causing to the service band frequency spectrum; and
    using at least one of the assigned gateway frequency spectrums, the allocation group frequency spectrums, the beam frequency spectrums, the service band frequency spectrum, and the powers for the carriers to generate the at least one configuration profile.

6. The method of claim 5, wherein each of the allocation groups comprises at least one terminal type.

7. The method of claim 6, wherein the at least one terminal type is at least one of a handheld-inconspicuous device, a handheld-smartphone device, a handheld-ruggedized device, an asset tracking device, a portable device, a semi-fixed device, a vehicular device, a maritime-small device, a maritime-large device, and an aeronautical device.

8. The method of claim 5, wherein the components on the satellite are at least one of a solid state power amplifier (SSPA), a traveling wave tube amplifier (TWTA), and a diplexer.

9. The method of claim 5, wherein the service band frequency spectrum is at least one of a return calibration (RCAL) frequency spectrum, a forward calibration (FCAL) frequency spectrum, an absolute calibration (ACAL) frequency spectrum, and a pointing reference beacon (PRB) frequency spectrum.

10. The method of claim 1, wherein the method further comprises determining, by the at least one computer, power flux spectral density (PFSD) for each beam frequency spectrum by using the at least one configuration profile.

11. A system for integrated resource planning for a satellite system, the system comprising:
    at least one computer to obtain user communication demand for at least one region; to generate a beam map comprising at least one beam for each of the at least one region according to the user communication demand; to generate at least one configuration profile for the satellite system by using the beam map; and to perform performance analysis by comparing at least one of the user communication demand versus one of the at least one configuration profile, the user communication demand versus actual communication demand, one of the at least one configuration profile versus the actual communication demand, and one of the at least one configuration profile versus another one of the at least one configuration profile; and the satellite system to be configured, based on the performing, to allocate resources according to one or more of the configuration profiles.

12. The system of claim 11, wherein at least one of the at least one region is defined by a polygon.

13. The system of claim 12, wherein the polygon is defined by at least three points, wherein each point comprises a latitude and a longitude.

14. The system of claim 11, wherein the at least one beam is a cell.

15. The system of claim 11, wherein to generate, by the at least one computer, the at least one configuration profile comprises at least one of:

to assign a gateway frequency spectrum for each gateway of the satellite system;

to assign an allocation group frequency spectrum for each allocation group;

to assign a beam frequency spectrum for each beam in the beam map;

to assign a service band frequency spectrum for each gateway;

to assign power for a carrier of the beam frequency spectrum for each beam to achieve at least one of a desired data rate and link margin for each beam;

to verify that the assigned power will not overdrive any components on the satellite;

to verify that the assigned power will not overdrive any components on each gateway;

to estimate an amount of interference the allocation group frequency spectrums are causing to the service band frequency spectrum; and to use at least one of the assigned gateway frequency spectrums, the allocation group frequency spectrums, the beam frequency spectrums, the service band frequency spectrum, and the powers for the carriers to generate the at least one configuration profile.

16. The system of claim 15, wherein each of the allocation groups comprises at least one terminal type.

17. The system of claim 16, wherein the at least one terminal type is at least one of a handheld-inconspicuous device, a handheld-smartphone device, a handheld-ruggedized device, an asset tracking device, a portable device, a semi-fixed device, a vehicular device, a maritime-small device, a maritime-large device, and an aeronautical device.

18. The system of claim 15, wherein the components on the satellite are at least one of a solid state power amplifier (S SPA), a traveling wave tube amplifier (TWTA), and a diplexer.

19. The system of claim 15, wherein the service band frequency spectrum is at least one of a return calibration (RCAL) frequency spectrum, a forward calibration (FCAL) frequency spectrum, an absolute calibration (ACAL) frequency spectrum, or a pointing reference beacon (PRB) frequency spectrum.

20. The system of claim 11, wherein the at least one computer is further configured to determine power flux spectral density (PFSD) for each beam frequency spectrum by using the at least one configuration profile.

* * * * *

UNITED STATES PATENT AND TRADEMARK OFFICE
CERTIFICATE OF CORRECTION

PATENT NO. : 10,069,560 B2
APPLICATION NO. : 15/216400
DATED : September 4, 2018
INVENTOR(S) : Tuan Ha et al.

Page 1 of 1

It is certified that error appears in the above-identified patent and that said Letters Patent is hereby corrected as shown below:

In the Claims

In Claim 18, Column 14, Line 19, change "(S SPA)" to --(SSPA)--.

Signed and Sealed this
Thirteenth Day of November, 2018

Andrei Iancu
*Director of the United States Patent and Trademark Office*